(12) United States Patent
Pettersson et al.

(10) Patent No.: US 7,176,264 B2
(45) Date of Patent: Feb. 13, 2007

(54) PROCESS FOR MANUFACTURE OF A DENDRITIC POLYETHER

(75) Inventors: Bo Pettersson, Lund (SE); David James, Helsingborg (SE); Birger Midelf, Angelholm (SE); Hakan Bjornberg, Angelholm (SE); Nicola Rehnberg, Perstorp (SE)

(73) Assignee: Perstorp Specialty Chemicals AB, Perstorp (SE)

( * ) Notice: Subject to any disclaimer, the term of this patent is extended or adjusted under 35 U.S.C. 154(b) by 160 days.

(21) Appl. No.: 10/416,712

(22) PCT Filed: Nov. 12, 2001

(86) PCT No.: PCT/SE01/02519

§ 371 (c)(1),
(2), (4) Date: Jul. 7, 2003

(87) PCT Pub. No.: WO02/40572

PCT Pub. Date: May 23, 2002

(65) Prior Publication Data

US 2004/0059086 A1 Mar. 25, 2004

(30) Foreign Application Priority Data

Nov. 14, 2000 (SE) .................... 0004155

(51) Int. Cl.
*C08G 65/18* (2006.01)
(52) U.S. Cl. ...................... 525/410; 528/417
(58) Field of Classification Search ............... 525/410; 528/405
See application file for complete search history.

(56) References Cited

U.S. PATENT DOCUMENTS

| | | | |
|---|---|---|---|
| 2,947,722 A | 8/1960 | Boardman | |
| 3,966,687 A * | 6/1976 | Ribba | 526/261 |
| 4,393,199 A | 7/1983 | Manser | |
| 4,952,644 A | 8/1990 | Wardle et al. | |
| 4,988,797 A | 1/1991 | Wardle et al. | |
| 5,516,854 A | 5/1996 | Wardle et al. | |

FOREIGN PATENT DOCUMENTS

| | | |
|---|---|---|
| EP | 0531591 | 3/1993 |
| WO | 0056802 | 9/2000 |
| WO | 0114300 | 3/2001 |

OTHER PUBLICATIONS

Macromol. Rapid Commun., vol. 20, 1999, Bednarek et al., " Branched polyether with multiple primary hydroxyl groups: polymerization of 3-ethyl-3-hydroxylmethyloxetane"; pp. 369-372.
STN International, File CAPLUS, Caplus accession No. 2001:202866, Malmstrom, Eva E et al; "Hyperbranched polyethers based on 3-ethyl-3-(hydromethyl)oxetane"; Am. Chem. Soc. (2001), 221st.
Macromol. Rapid Commun., vol. 21, 2000, Deyue Yan et al., "A new approach to control crystallinity of resulting polymers: Self-condensing ring opening polymerization" p. 557-561.
Macromol Rapid Commun., vol 20, 1999, Helene Magnusson et al., "Synthesis of hyperbranched aliphatic polyethers via cationic ringopening polymerization of 3-ethyl-3-(hydroxymethyl)oxetane"; pp. 453-457.

* cited by examiner

*Primary Examiner*—Robert Sellers
(74) *Attorney, Agent, or Firm*—Stevens, Davis, Miller & Mosher, L.L.P.

(57) ABSTRACT

A process for manufacture of a dendritic polyether comprising a core, derived from a compound having two or more hydroxyl groups, and at least one branching generation being built up from at least one hydroxyoxetane having one oxetane group and at least one hydroxyl group is disclosed. The process comprises ring opening addition to said core and ring opening polymerization of said hydroxyoxetane. A mixture of the core compound and at least one cationic initiator is prepared and said hydroxyoxetane is fed to said mixture at a rate resulting in and/or maintaining a reaction temperature below onset at thermal degradation and in an amount resulting in at least one branching generation. The initiator is present in an amount of 0.1–0.5% by weight calculated on said core and said oxetane, preferably in an amount giving a ratio hydroxyl groups to initiator of between 1:0.01 and 1:0.05. Yielded dendritic polyether is sebsequently neutralised by addition of at least one alkaline compound and optionally purified.

30 Claims, 5 Drawing Sheets

FIG. 1  Dendritic polymer without core
FIG. 2  Dendritic polymer with trifunctional core
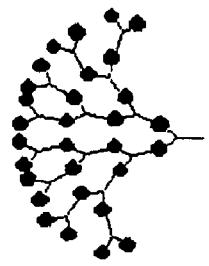
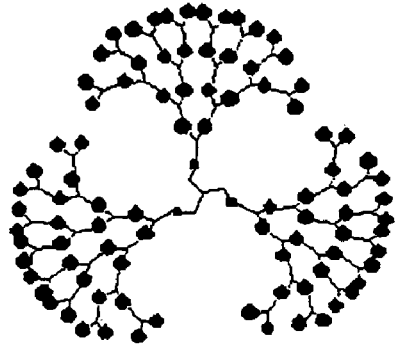
FIG. 3  Principle for Divergent Synthesis
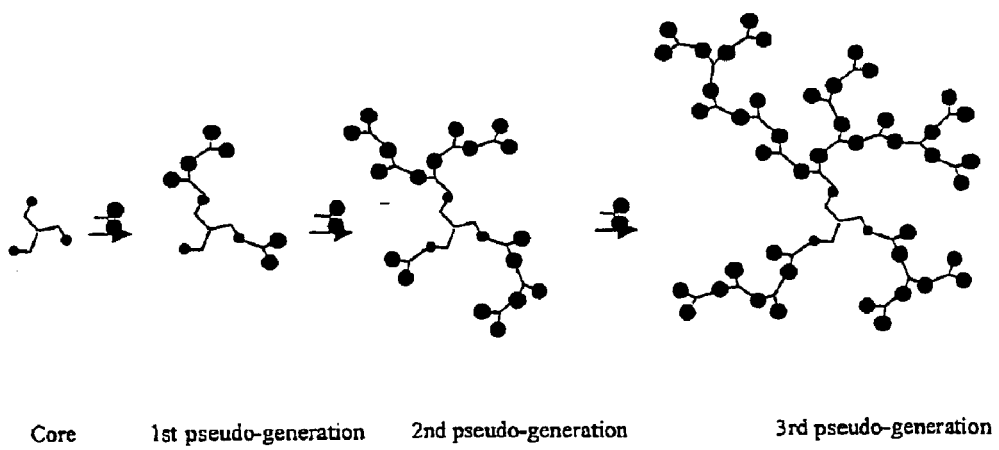
Core     1st pseudo-generation     2nd pseudo-generation     3rd pseudo-generation GPC profile of product obtained in Example 1

GPC profile of product obtained in Example 2

GPC profile of product obtained in Example 3

GPC profile of product obtained in Example 4

GPC profile of product obtained in Example 5

DSC measurements of samples of products obtained in Example 2

TGA measurements of samples of products obtained in Example 2

Residual monomer content in products obtained in
Example 3 (embodiment) and Example 5 (comparative)

PROCESS FOR MANUFACTURE OF A DENDRITIC POLYETHER

CROSS REFERENCE TO RELATED APPLICATIONS

This application is a U.S. National Stage application under 35 USC § 371 of PCT/SE01/02519, filed Nov. 14, 2000, herein incorporated by reference in its entirety.

BACKGROUND

The present invention refers to a process for manufacture of a dendritic polyether comprising a core and at least one branching generation. The process comprises mixing at least one compound having two or more hydroxyl groups and at least one cationic initiator and subjecting at least one hydroxyoxetane to ring opening addition and polymerisation. Said hydroxyoxetane is charged at a rate resulting in and maintaining a reaction below onset at thermal degradation and in an amount resulting in at least one branching generation.

Dendritic polymers belong to a group of polymers, characterised by densely branched structures and a large number of end groups. They are obtained by the polymerisation of for instance $AB_x$ monomers, such as $AB_2$ monomers, giving branched structures, with an exponential growth, in both molecular weight and end group functionality, as a function of the degree of polymerisation. Dendritic polymers are either produced by homo or co-polymerisation of one or several monomers, optionally in the presence of a multifunctional core. FIGS. 1 and 2 below illustrate dendritic polymers with and without core.

The use of a multifunctional core is of particular interest, since it allows a higher degree of freedom in the molecular design of dendritic structures. In "*Surface Coatings Technology*" Volume IV, Chapter V, Bo Pettersson et.al, John Wiley & Sons Ltd, it is taught that two sets of properties can be controlled by the use of a multifunctional core, namely i) the ability to control molecular weight and polydispersity, and ii) the physical properties at a given molecular weight. Examples are given of polydisperse dendritic polyesters, which have been produced with and without the use of a polyalcohol core and it was found that both the polydispersity at a given molecular weight as well as the bulk viscosity could be reduced when a trifunctional polyalcohol core was employed versus homo-polymerisation of the neat monomer 2,2-dimethylolpropionic acid.

Dendritic polymers built up from multifunctional cores are often produced, according to a divergent growth pattern. In the divergent synthesis route, monomers such as $AB_x$ monomers (also called chain extenders) first react with a multifunctional core in stoichometric ratio with regard to the number of reactive groups of the core molecule and the number of A groups of the $AB_x$ monomer. Obtained reaction product will when $AB_2$ monomers are used have twice the functionality of the starting core molecule. The reaction product according to the first step can then in subsequent steps undergo reactions with further $AB_x$ monomers, until the desired molecular weight and/or end group functionality is obtained. The principle for a divergent synthesis route is illustrated in FIG. 3 below.

The term generation is often used for dendritic polymers to describe the number of repetitive steps involved in a synthesis and hence indirectly the molecular weight and end group functionality. In the case of polydisperse products, the term pseudo-generation is sometimes used to clarify that there is an uncertainty as to where exactly the $AB_x$ monomers are located within the dendritic structure. The term generation will herein be used as designation for generation as well as pseudo-generation and is defined in accordance with equations 1–3 below.

$$F = f \times X^n \quad \text{Eq. 1}$$

$$N = f(X^n - 1) \quad \text{Eq. 2}$$

$$M_{HBP} = N[M_e - M_{R1}] + \mu F[M_t - M_{R2}] + M_I \quad \text{Eq. 3}$$

Wherein
n = Number of generations or pseudo-generations.
F = End group functionality of dendritic polymer with n generations.
N = Equivalents of chain extenders per equivalent of dendritic polymer with a core functionality f and n generations or pseudo-generations.
$M_{HBP}$ = Molecular weight of end-capped dendritic polymer with n generations.
$M_e$ = Molecular weight of chain extender.
$M_{R1}$ = Molecular weight of reaction product formed in reaction between groups A and B (which for polyesters is the molecular weight of $H_2O$).
$\mu$ = Fraction of end groups capped with an end-capping group.
$M_t$ = Molecular weight of end-capping group.
$M_{R2}$ = Molecular weight of reaction product formed in reaction between terminal groups and end-capping groups.
$M_c$ = Molecular weight of core molecule.

Dendritic polyethers made by ring opening polymerisation have attracted some interest recently. Dendritic structures made from glycidol have been studied by Vandenberg, E. J., *Pol. Sci., Part A: Polym. Chem.*, 1989, 27, 3113 and Sunder, A. et.al., *Macromolecules*, 1999, 32, 4240 and dendrite structures from and 3-ethyl-3-hydroxymethyloxetane (trimethylolpropaneoxetane) by Magnusson, H. et.al., *Macromol. Rapid Commun.*, 1999, 20, 453–457.

Ring opening polymerisation of oxetanes is per se known in the art and disclosed and discussed in for instance a number of Patents. U.S. Pat. No. 4,988,797 discloses polymerisation of cyclic ethers having 4 and 5 membered rings in the presence of an intiator consiting of an acid catalyst and an alcohol. The polymers are grown from the alcohol. The acid catalyst is employed at a level of between 0.05 and 0.5 relative to the hydroxyl functionalty of the alcohol. Exemplified polymers are starbranched polyethers. U.S. Pat. No. 6,100,375 teaches an improved method for synthesis of energetic polymers based on cyclic ethers having 4 and 5 member rings. Said polymers are produced in the presence of a solvent by employing a triethoxonium salt and an alcohol, both in co-catalytically amounts, as initiator. Disclosed cyclic ethers are monocyclic compounds having at least one $(CH_3)_nX$ group, X being $-N_3$, $-H$, $-ONO_2$, $-CL$, $-CN$, $-BR$ or $-O(C_1-C_{10}$ alkyl). Synthesis of ABA triblock polymers and $A_nB$ star polymers from cyclic ethers is described in U.S. Pat. No. 4,952,644.

Dendritic polyethers obtained by ring opening polymerisation of hydroxyoxetanes (compounds having one oxetane group and at least one hydroxyl group) offer a rapid process yielding dendritic structures. Dendritic polyethers are furthermore, and contrary to dendritic polyesters, hydrolytically stable, which is of interest in applications wherein an aqeuous and alkaline environment is employed. It is of particular interest to study dendritic polyethers made by ring opening polymerisation of 3-ethyl-3-hydroxymethyloxetane, since the monomer is non-toxic and hence environmentally friendly. The 3-ethyl-3-hydroxymethyloxetane monomer is furthermore only possible to polymerise under cationic conditions, which allows the hydroxyl functionality to be modified under alkaline conditions prior to polymerisation. Said modified product can then be used as co-monomer with for instance neat 3-ethyl-3-hydroxymethyloxetane or other hydroxyoxetane and specific functionalities can thereby be incorporated in the inherent dendritic polymer backbone. Dendritic polymers made from hydroxyoxetanes offer interesting physical properties such as a glas transition temperatures (Tg) in the range of 30–45° C. for polymers made from 3-ethyl-3-hydroxymethyloxetane and low melt viscosities at elevated temperatures.

It has however been found that in order to produce dendritic polyethers from hydroxyoxetanes as defined above, it is difficult to control final molecular weights and obtained polymers differ significantly in properties and chemical conversion, depending on the reaction temperature during polymerisation.

Surprisingly, it has been found that hydroxyoxetane based polymers can suffer from poor thermal stability in air atmosphere and if the reaction temperature is above the onset at thermal degradation, poor final properties will result with low final molecular weights and large amount of residual monomers. Onset is here and hereinafter defined as the left limit of exothermic degradation peak in air at a heating rate of at least 3° C./minute.

A method to overcome above mentioned problems with control of molecular weight of dendritic polyethers from hydroxyoxetanes and the thermal degradation can now quite surprisingly be disclosed. It has been found that it is possible to produce dendritic polyethers from hydroxyoxetanes by employing a divergent synthesis approach, wherein a multifunctional alcohol is used as an initiator core. By using the same theoretical approach as has succesfully been demonstrated for dendritic polyesters made from 2,2-dimethylolpropionic acid and polyalcohol cores, it is possible to control both final molecular weight and polydispersity. It has furthermore been found that by using particular conditions during synthesis it is possible to reach very high chemical conversion and to control the polydispersity, final molecular weight and the like. Said conditions include that a cationic initiator is pre-mixed with an alcoholic core, that at least one hydroxyoxetane monomer is feeded continously to the reaction solution with strict temperature control and the reaction solution is kept at a certain temperature interval below onset at thermal degradation. It has also quite surprisingly been found that the thermal stability of obtained dendritic polyether, having one or more generations built up from at least one hydroxyoxetane and a polyalcohol core, can be significantly improved by neutralising the cationic initiator in stoichiometric amounts with a conventional alkaline species, such as NaOH and the like.

Obtained dendritic polyether disclosed and produced according to the method of the present invention is hence superiour in terms of control of molecular weight and thermal stability compared to what previously have been demonstrated with oxetane monomers.

SUMMARY OF THE INVENTION

The present invention accordingly refers to a process for manufacture of a dendritic polyether comprising a core, derived from a compound having two or more hydroxyl groups, and at least one branching generation, preferably at least two branching generations, being built up from at least one hydroxyoxetane having one oxetane group and at least one hydroxyl group. The process comprises ring opening addition to said core and ring opening polymerisation of said oxetane. A mixture of said compound having said two or more hydroxyl groups and at least one cationic initiator is prepared and optionally heated to 90–130° C. and said at least one hydroxyoxetane is fed to said mixture at a rate resulting in and/or maintaining a reaction temperature, during said ring opening addition and said ring opening polymerisation, being below onset at thermal degradation as defined by DSC (Differential Scanning Calorimetry) in air and in an amount resulting in said at least one branching generation. The initiator is present in an amount of 0.1–0.5% by weight calculated on said core and said hydroxyoxetane, preferably in an amount giving a ratio hydroxyl groups to initiator of between 1:0.01 and 1:0.05 preferably between 1:0.01 and 1:<0.05. Yielded dendritic polyether is furthermore neutralised by addition of an alkaline compound and optionally purified. Said reaction temperature is preferably 110±20° C., such as 100±10° C. and said hydroxyoxetane is preferably fed to said mixture during at least 30 minutes.

Yielded dendritic polyether has a preferred polydispersity of less than 2, such as less than 1.8, less than 1.6 or even less than 1.4, a preferred thermal degradation point of more than 200° C., such as more than 250° C. and a residual monomer content (prior to said optional purification) of less than 1%, such as less than 0.8% or less than 0.6% by weight.

The compound (core compound) having said at least two hydroxyl groups is in preferred embodiments of the process of the present invention a di, tri or polyhydric alcohol, a di, tri or polyhydric ester or polyester or a di, tri or polyhydric ether or polyether, such as a 5,5-dihydroxyalkyl-1,3-dioxane, a 5,5-di(hydroxyalkoxy)-1,3-dioxane, a 5,5-di(hydroxyalkoxyalkyl)-1,3-dioxane, a 2-alkyl-1,3-propanediol, a 2,2-dialkyl-1,3-propanediol, a 2-hydroxy-1,3-propanediol, a 2,2-dihydroxy-1,3-propanediol, a 2-hydroxy-2-alkyl-1,3-propanediol, a 2-hydroxyalkyl-2-alkyl-1,3-propanediol, a 2,2-di(hydroxyalkyl)-1,3-propanediol, a 2-hydroxyalkoxy-2-alkyl-1,3-propanediol, a 2,2-di(hydroxyalkoxy)-1,3-propanediol, a 2-hydroxyalkoxyalkyl-2-alkyl-1,3-propanediol or a 2,2-di(hydroxyalkoxyalkyl)-1,3-propanediol.

Further preferred embodiments of said compound having said at least two hydroxyl groups include dimers, trimers and polymers of a 5,5-dihydroxyalkyl-1,3-dioxanes, 5,5-di(hydroxyalkoxy)-1,3-dioxanes, 5,5-di(hydroxyalkoxyalkyl)-1,3-dioxanes, 2-alkyl-1,3-propanediols, 2,2-dialkyl-1,3-propanediols, 2-hydroxy-1,3-propanediols, 2,2-dihydroxy-1,3-propanediols, 2-hydroxy-2-alkyl-1,3-propanediols, 2-hydroxyalkyl-2-alkyl-1,3-propanediols, 2,2-di(hydroxyalkyl)-1,3-propanediols, 2-hydroxyalkoxy-2-alkyl-1,3-propanediols, 2,2-di(hydroxyalkoxy)-1,3-propanediols, 2-hydroxyalkoxyalkyl-2-alkyl-1,3-propanediols and 2,2-di(hydroxyalkoxyalkyl)-1,3-propanediols.

In above disclosure, alkyl is preferably $C_1$–$C_{24}$, such as $C_1$–$C_{12}$ or $C_1$–$C_8$, linear or branched alkanyl or alkenyl and alkoxy is preferably ethoxy, propoxy, butoxy, phenylethoxy nominally comprising 0.2–20 alkoxy units or is a combination of two or more of said alkoxy nominally comprising 0.2–10 units of respective alkoxy and nominally comprising a total of 0.2–20 alkoxy units.

Yet further embodiments of said compound having said at least two hydroxyl groups include monoallyl or mono(methallyl) ethers of glycerol, trimethylolethane and trimethylolpropane, monoallyl, diallyl, mono(methallyl) or di(methallyl) ethers of di(trimethylolethane), di(trimethylolpropane) and pentaerythritol as well as 1,ω-diols, such as mono, di, tri and polyethylene glycols, mono, di, tri and polypropylene glycols, 1,4-butanediol, 1,5-pentanediol, 1,6-hexanediol, 1,6-cyclohexanedimethanol and alkyl, alkylalkoxy and alkoxyalkyl substituted species and derivatives thereof. Alkyl and alkoxy is here preferably as previously disclosed.

Especially preferred embodiments of said compound having said at least two hydroxyl groups are advantegously selected from the group consisting of 5,5-dihydroxymethyl-1,3-dioxane, 2-methyl-1,3-propanediol, 2-methyl-2-ethyl-1,3-propanediol, 2-ethyl-2-butyl-1,3-propanediol, neopentyl glycol, dimethylpropane, glycerol, trimethylolethane, trimethylolpropane, diglycerol, di(trimethylolethane), di(trimethylolpropane), pentaerythritol, di(pentaerythritol), anhydroenneaheptitol, sorbitol and mannitol.

The hydroxyoxetane employed in the process of the present invention is preferably a 3-alkyl-3-(hydroxyalkyl)oxetane, a 3,3-di(hydroxyalkyl)oxetane, a 3-alkyl-3-(hydroxyalkoxy)oxetane, a 3-alkyl-3-(hydroxyalkoxyalkyl)oxetane or a dimer, trimer or polymer of a 3-alkyl-3-(hydroxyalkyl)oxetane, a 3,3-di(hydroxyalkyl)oxetane, a 3-alkyl-3-(hydroxyalkoxy)oxetane or a 3-alkyl-3-(hydroxyalkoxyalkyl)oxetane. Alkyl is here preferably $C_1$–$C_{24}$, such as $C_1$–$C_{12}$ or $C_1$–$C_8$, linear or branched alkanyl or alkenyl and alkoxy preferably ethoxy, propoxy, butoxy, phenylethoxy nominally comprising 0.2–20 alkoxy units or is a combination of two or more of said alkoxy nominally comprising 0.2–10 units of respective alkoxy and nominally comprising a total of 0.2–20 alkoxy units.

Said at least one hydroxyoxetane is in especially preferred embodiments 3-methyl-3-(hydroxymethyl)oxetane, 3-ethyl-3-(hydroxymethyl)oxetane, 3,3-di(hydroxymethyl)oxetane or a combination and/or mixture of two or more of said hydroxyoxetanes.

Said at least one cationic initiator is suitably and preferably at least one Lewis acid, such as $AlCl_3$, $BF_3$, $TiCl_4$, $ZnI_2$, $SiF_4$, $SbF_5$, $PF_5$, $AsF_5$ or $SbCl_5$ and/or at least one halogenated acid, such as $FSO_3H$, $ClSO_3H$, $HClO_4$, $HIO_4$ or $CF_3SO_3H$.

The alkaline compound added for neutralisation of yielded product is advantageously selected from the group consisting of hydroxides and carbonates of at least one alkali metal or alkaline earth metal. Further suitable alkaline compounds include ammonia and amines.

BRIEF DESCRIPTION OF THE DRAWINGS

FIG. 1 shows a dendritic polymer without a core.

FIG. 2 shows a dendritic polymer with a trifunctional core.

FIG. 3 shows a principle for divergent synthesis.

DETAILED DESCRIPTION OF THE INVENTION

Figure 9:
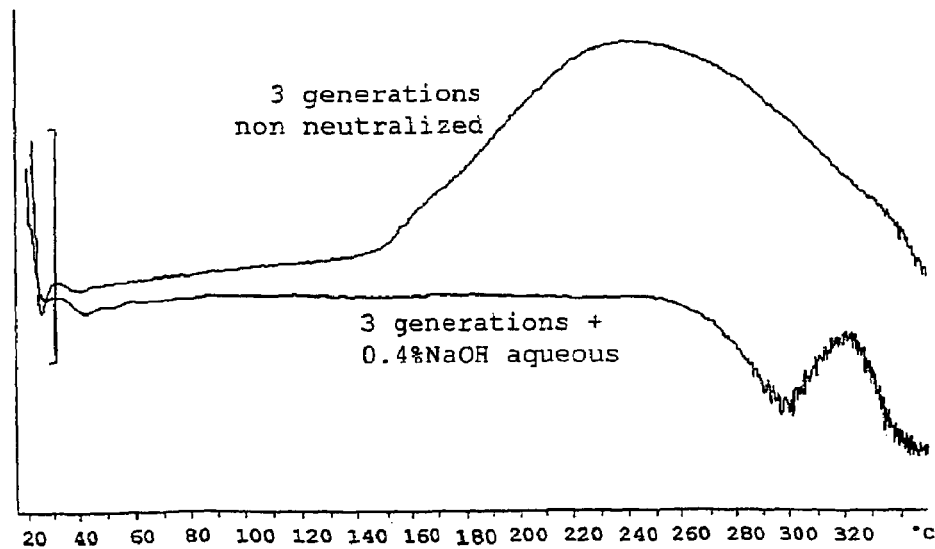
FIG. 9 is a graph showing DSC measurements of samples of products obtained in Example 2.
Figure 10:
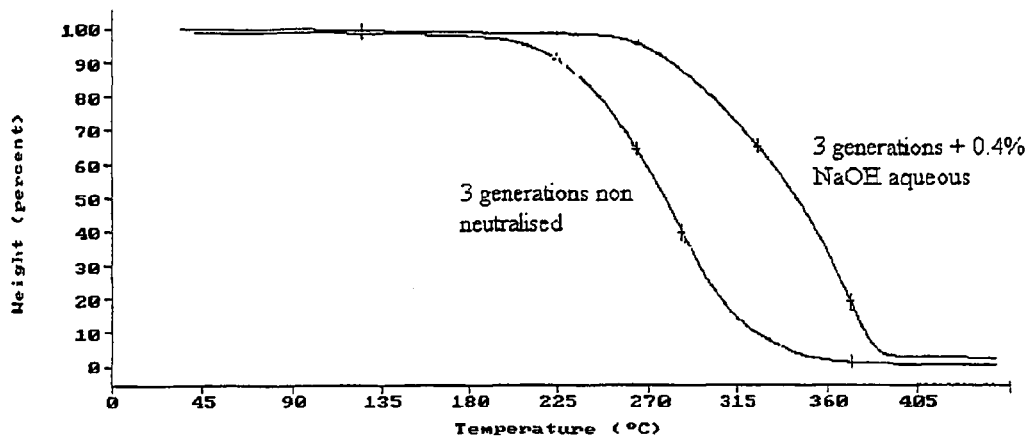
FIG. 10 is a graph showing TGA measurements of samples of products obtained in Example 2.
Figure 11:
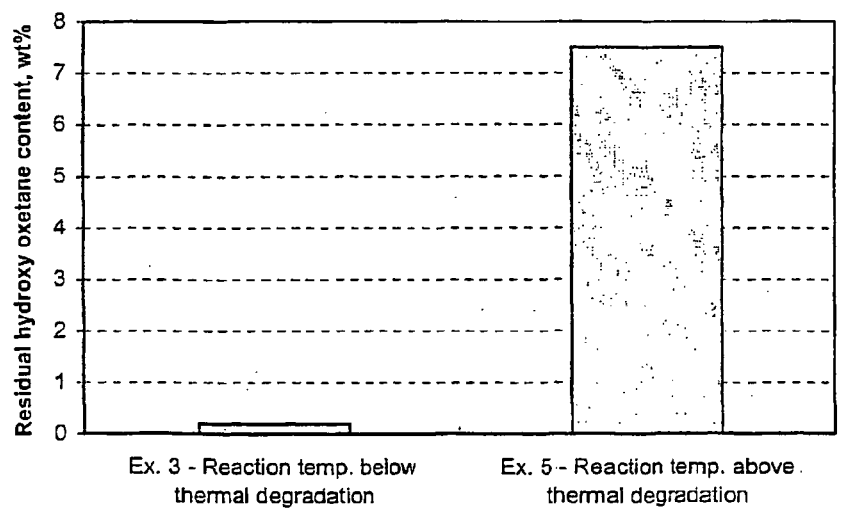
FIG. 11 is a graph showing residual monomer contents in products obtained in Examples 3 and 5.

Without further elaboration, it is believed that one skilled in the art can, using the preceding description, utilise the present invention to its fullest extent. The following preferred specific embodiments are, therefore, to be construed as merely illustrative and not limitative of the remainder of the disclosure in any way whatsoever. In the following, Example 1 (Reference) disclose cationic polymerisation, outside the scope of the present invention, of a hydroxyoxetane, Examples 2–4 refer to embodiments of the process of the present invention and Example 5 (Comparative) refer to a process for preparation of a dendritic polyether similar to Examples 2–4, the synthesis being performed at a temperature above onset at thermal degradation. FIGS. 4–8 present the GPC (general purpose chromatography) profiles of the products obtained in Examples 1–5 and FIGS. 9 and 10 present DSC (differential scanning calorimetry) and TGA (thermal gravimetric analysis) measurements of a neutralised and a non-neutralised sample of the product obtained in Example 2. FIG. 11 presents a comparison between products obtained in Example 3 (Embodiment) and Example 5 (Compartive) with regard to residual monomer (hydroxyoxetane) content).

EXAMPLE 1

Reference

A dendritic polyether without core was prepared from a hydroxyoxetane by ring opening polymerisation.

1.0 g of a solution (50% in diethylether) of $BF_3$ was at room temperature charged to a reactor equipped with a mechanical stirrer, a cooler and a heating system with adequate heating control. The temperature was increased to 120° C. and 500.0 g of 3-ethyl-3-(hydroxymethyl)oxetane (TMPO, Perstorp Specialty Chemicals, Sweden) was fed continuously to the reactor during 30 minutes in order to control the exothermic character of the reaction. The strong exotherm was seen as a result of the ring opening polymerization of the oxetane monomer. Once the exotherm faded, the reaction mixture was kept at 120° C. under stirring for a further 3.5 hours. The reaction mixture was then cooled to room temperature and the final product was recovered.

The obtained dendritic polyether exhibited following characteristics:

| | |
|---|---|
| Hydroxyl value, mg KOH/g: | 482 |
| Molecular weight average (Mw), g/mole: | 8 297 |
| Polydispersity: | 11.4 |
| Low molecular weight compounds (<400 g/mole), %: | 3.8 |
| Nominal hydroxyl functionality: | 56 |
| Chemical conversion, %:* | 99.1 |
| Viscosity (110° C., 30s$^{-1}$), Pa.s: | 52 |

*with regard to residual monomer content

The GPC profile of yielded product is given in FIG. 1.

EXAMPLE 2

A dendritic polyether comprising a core and-three-branching generations was prepared from a tetrahydric alcohol and a hydroxyoxetane by ring opening addition and polymerisation.

49.18 g of an ethoxylated pentaerythritol (Polyol PP50, Perstorp Specialty Chemicals, Sweden) was at room temperature mixed with 1.00 g of a solution (50% in diethylether) of $BF_3$, giving a ratio $OH:BF_3$ of 1:0.013, and charged to a reactor equipped with a mechanical stirrer, a cooler and a heating system with adequate heating control. The mixture was heated to 110° C. and 450.00 g of 3-ethyl-3-(hydroxymethyl)oxetane (TMPO, Perstorp Specialty Chemicals, Sweden) was continuously fed to said mixture at a rate of 12.85 g/min (feeding time 35 minutes). Heating was during feeding not necessary because of the exotherm and cooling was used during said feeding time and for a further 30 minutes. Heating was then necessary in order to maintain a temperature of 110° C. The reaction was allowed to continue under stirring for a further 3.5 hours. The reaction mixture was then cooled to room temperature and the final product was recovered.

The obtained dendritic polyether exhibited following characteristics:

| | |
|---|---|
| Hydroxyl value, mg KOH/g: | 504 |
| Peak molecular weight, (GPC) g/mole: | 2 857 |
| Polydispersity: | 1.41 |
| Low molecular weight compounds (<400 g/mole), %: | 1.8 |
| Nominal hydroxyl functionality: | 25.6 |
| Chemical conversion, %:* | 99.7 |
| Viscosity (110° C., $30s^{-1}$), Pa.s: | 3.6 |
| Glass transition temperature, ° C.: | 32 |

*with regard to residual monomer content

The GPC profile of yielded product is given in FIG. 2.

100 g of obtained dendric polyether was heated to 110° C. in a reactor equipped with a mechanical stirrer. 0.4 g of an aqueous solution of NaOH (41%) was added to the melt and stirred for 10 minutes. A small sample was tested in a DSC Mettler TA8000 between room temperature and 320° C. in air. Heating rate was 10° C./min. The neutralised sample was compared to a sample collected before neutralisation.

The result is given in enclosed FIG. 9 (DSC) and FIG. 10 (TGA) evidencing the improved stability of the neutralised sample. The onset at degradation is increased with 80–100° C. by addition of a small amount of a base.

EXAMPLE 3

A dendritic polyether comprising a core and four branching generations was prepared from a tetrahydric alcohol and a hydroxyoxetane by ring opening addition and polymerisation.

23.97 g of an ethoxylated pentaerythritol (Polyol PP50, Perstorp Specialty Chemicals, Sweden) was at room temperature mixed with 0.98 g of a solution (50% in diethylether) of $BF_3$, giving a ratio $OH:BF_3$ of 1:0.012, and charged to a reactor equipped with a mechanical stirrer, a cooler and a heating system with adequate heating control. The mixture was heated to 110° C. and 470.00 g of 3-ethyl-3-(hydroxymethyl)oxetane (TNPO, Perstorp Specialty Chemicals, Sweden) was continuously fed to said mixture at a rate of 13.4 g/min (feeding time 35 minutes). Heating was during feeding not necessary because of the exotherm and cooling was used during said feeding time and for a further 30 minutes. Heating was then necessary in order to maintain a temperature of 110° C. The reaction was allowed to continue under stirring for a further 3.5 hours. The reaction mixture was then cooled to room temperature and the final product was recovered.

The obtained dendritic polyether exhibited following characteristics:

| | |
|---|---|
| Hydroxyl value, mg KOH/g: | 496 |
| Peak molecular weight, (GPC) g/mole: | 3 763 |
| Polydispersity: | 1.59 |
| Low molecular weight compounds (<400 g/mole), %: | 3.2 |
| Nominal hydroxyl functionality: | 33.3 |
| Chemical conversion, %:* | 99.8 |
| Viscosity (110° C., $30s^{-1}$), Pa.s: | 86 |
| Glass transition temperature, ° C.: | 38 |

*with regard to residual monomer content

The GPC profile of yielded product is given in FIG. 3.

Obtained dendritic polyether was neutralised as in Example 2.

EXAMPLE 4

A dendritic polyether comprising a core and three branching generations was prepared from a trihydric alcohol and a hydroxyoxetane by ring opening addition and polymerisation.

26.10 g of an trimethylolpropane (Perstorp Specialty Chemicals, Sweden) was heated to 120° C. and mixed with 0.99 g of a solution (50% in diethylether) of $BF_3$, giving a ratio $OH:BF_3$ of 1:0.013, and charged to a reactor equipped with a mechanical stirrer, a cooler and a heating system with adequate heating control. 470.00 g of 3-ethyl-3-(hydroxymethyl)oxetane (TMPO, Perstorp Specialty Chemicals, Sweden) was continuously fed to the mixture at a rate of 13.4 g/min (feeding time 35 minutes). Heating was during feeding not necessary because of the exotherm and cooling was used during said feeding time and for a further 30 minutes. Heating was then necessary in order to maintain a temperature of 110° C. The reaction was allowed to continue under stirring for a further 3.5 hours. The reaction mixture was then cooled to room temperature and the final product was recovered.

The obtained dendritic polyether exhibited following characteristics:

| | |
|---|---|
| Hydroxyl value, mg KOH/g: | 524 |
| Peak molecular weight, (GPC) g/mole: | 2 892 |
| Polydispersity: | 1.61 |
| Low molecular weight compounds (<400 g/mole), %: | 4.1 |
| Nominal hydroxyt functionality: | 27 |
| Chemical conversion, %:* | 999 |
| Viscosity (110° C., $30s^{-1}$), Pa.s: | 10.3 |
| Glass transition temperature, ° C.: | 43 |

*with regard to residual monomer content

Figure 4:
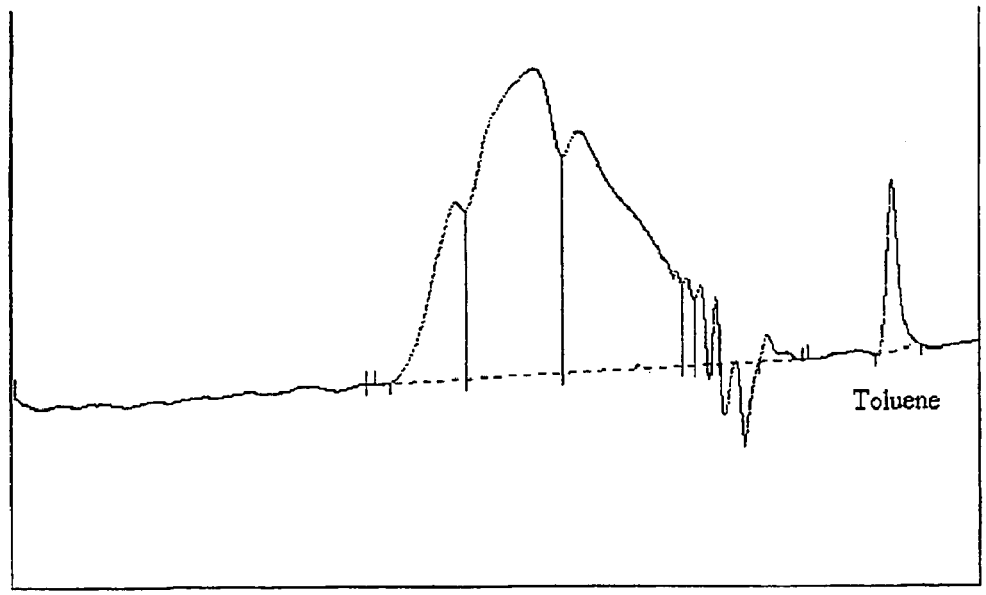
FIG. 4 is a graph showing GPC profile of the product of Example 1.

The GPC profile of yielded product is given in FIG. 4.

Obtained dendritic polyether was neutralised as in Example 2.

EXAMPLE 5

Comparative

A dendritic polyether comprising a core and three branching generations was prepared from a tetrahydric alcohol and a hydroxyoxetane by ring opening addition and polymerisation. The reaction temperature was kept above onset at thermal degradation.

49.18 g of an ethoxylated pentaerythritol (Polyol PP50, Perstorp Specialty Chemicals, Sweden) was at room temperature mixed with 1.00 g of a solution (50% in diethylether) of $BF_3$, giving a ratio $OH:BF_3$ was 1:0.013, and charged to a reactor equipped with a mechanical stirrer, a cooler and a heating system with adequate heating control. The mixture was heated to 130° C. and 450.00 g of 3-ethyl-3-(hydroxymethyl)oxetane (TMPO, Perstorp Specialty Chemicals, Sweden) was continuously fed to said mixture at a rate of 12.9 g/min (feeding time 35 minutes). Heating was during feeding not necessary because of the exotherm and cooling was used during said feeding time and for a further 30 minutes. Heating was then necessary in order to maintain a temperature of 130° C. The reaction was allowed to continue under stirring for a further 3.5 hours. The reaction mixture was then cooled to room temperature and the final product was recovered.

The obtained dendritic polyether exhibited following characteristics:

| | |
|---|---|
| Hydroxyl value; mg KOH/g: | 499 |
| Peak molecular weight, (GPC) g/mole: | 2 679 |
| Polydispersity: | 1.42 |
| Low molecular weight compounds (<400 g/mole), %: | 4.8 |
| Nominal hydroxyl functionality: | 23.8 |
| Chemical conversion, %:* | 92.5 |
| Viscosity (110° C., $30s^{-1}$), Pa.s: | 2.6 |

*with regard to residual monomer content

Figure 5:
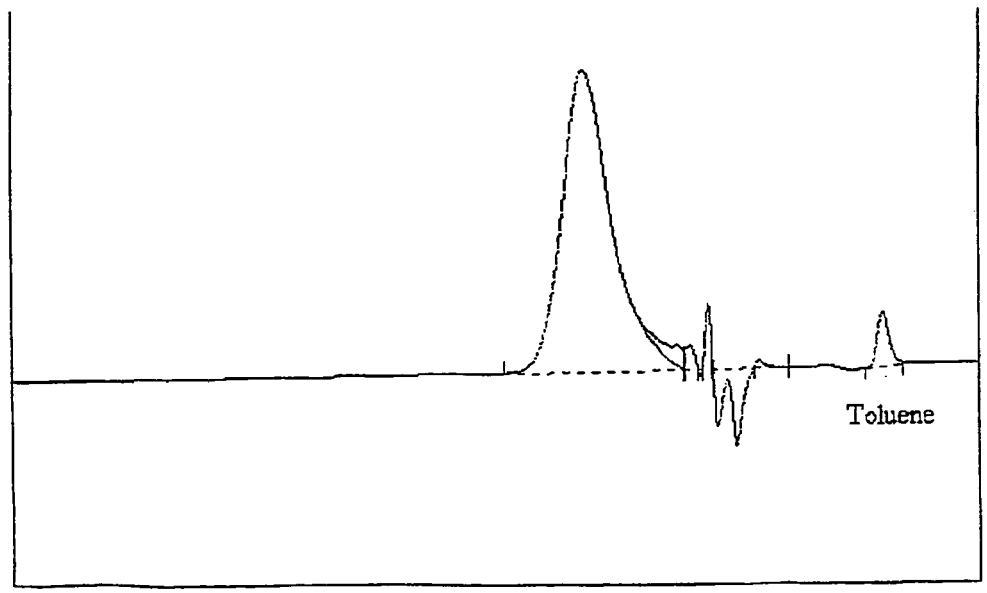
FIG. 5 is a graph showing GPC profile of the product of Example 2.
Figure 6:
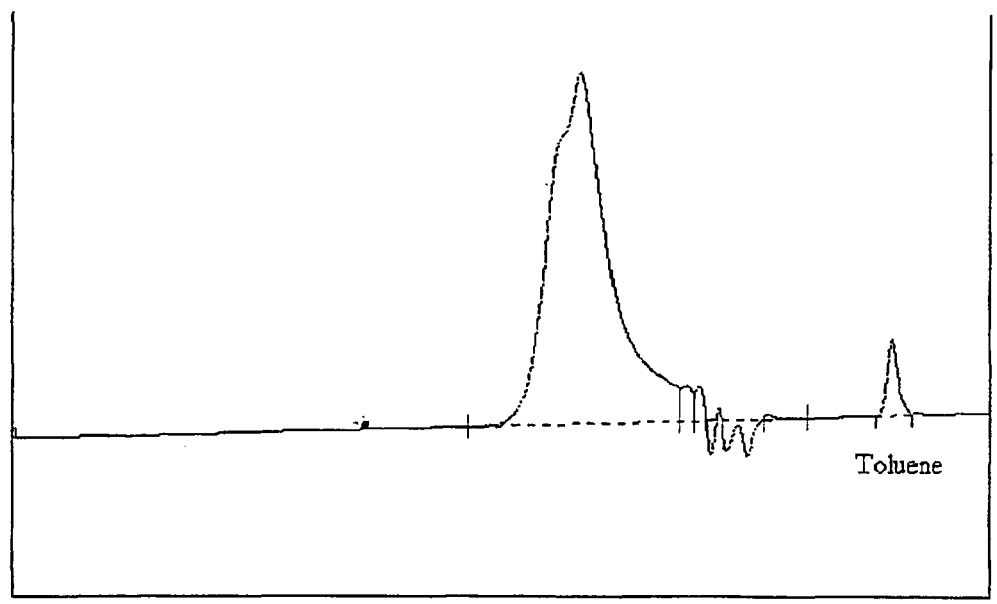
FIG. 6 is a graph showing GPC profile of the product of Example 3.
Figure 7:
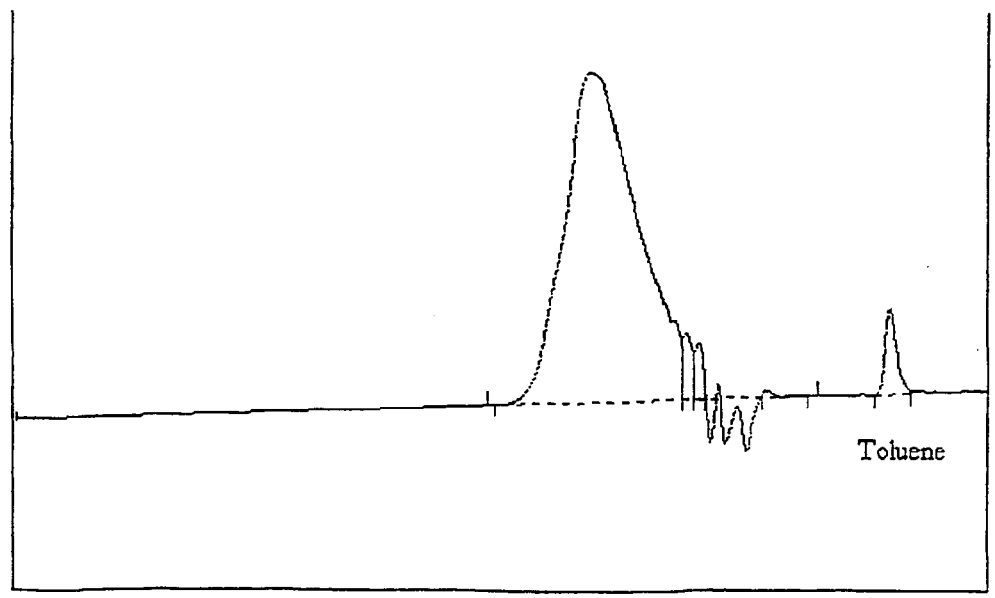
FIG. 7 is a graph showing GPC profile of the product of Example 7.
Figure 8:
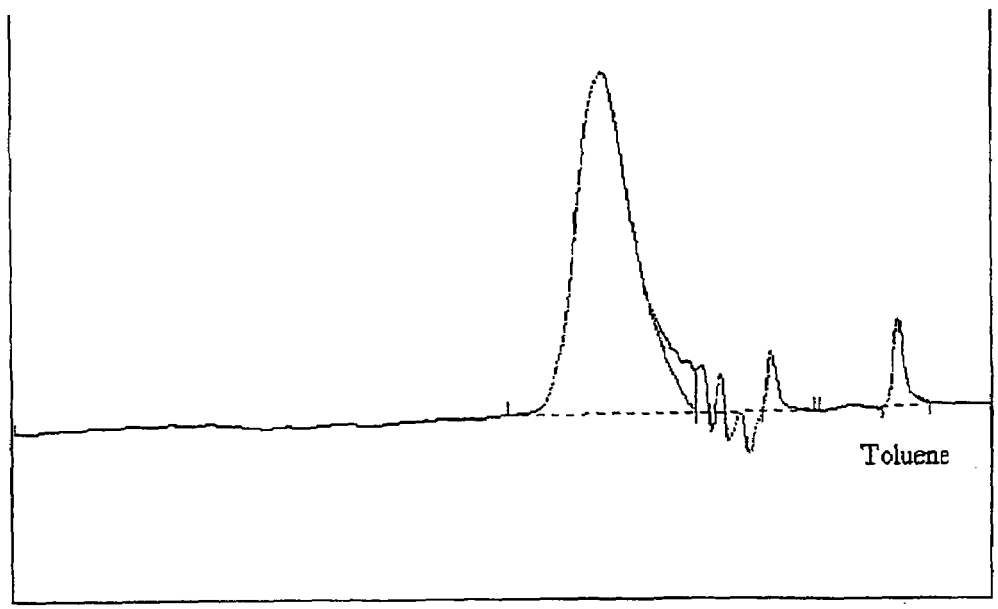
FIG. 8 is a graph showing GPC profile of the product of Example 5.

The GPC profile of yielded product is given in FIG. 5.

The invention claimed is:

1. A process for manufacture of a dendritic polyether comprising a core, derived from a compound having two or more hydroxyl groups, and at least one branching generation being built up from at least one hydroxyoxetane having one oxetane group and at least one hydroxyl group, said process comprising ring opening addition to said core and ring opening polymerization of said oxetane, wherein a mixture of said compound having said two or more hydroxyl groups and at least one cationic initiator is prepared and optionally heated to 90–130° C., that said hydroxyoxetane is fed to said mixture at a rate resulting in and/or maintaining a reaction temperature, during said ring opening addition and said ring opening polymerization, being below onset at thermal degradation and in an amount resulting in said at least one branching generation, that said initiator is present in an amount of 0.1–0.5% by weight calculated on said core and said hydroxyoxetane, preferably in an amount giving a ratio of hydroxyl groups to initiator of between 1:0.01 and 1:0.05, and that yielded dendritic polyether is neutralized by addition of at least one alkaline compound and optionally purified, wherein said compound having said at least two hydroxyl groups is 5,5-dihydroxyalkyl-1,3-dioxane, a 5,5-di(hydroxyalkoxy)-1,3-dioxane, a 5,5-di(hydroxyalkoxyalkyl)-1,3-dioxane, a 2-alkyl-1,3-propanediol, a 2,2-dialkyl-1,3-propanediol, a 2-hydroxy-1,3-propanediol, a 2,2-dihydroxy-1,3-propanediol, a 2-hydroxy-2-alkyl-1,3-propanediol, a 2-hydroxyalkyl-2-alkyl-1-,3-propanediol, a 2,2-di(hydroxyalkyl)-1,3-propanediol, a 2-hydroxy-alkoxy-2-alkyl-1,3-propanediol, a 2,2-di(hydroxyalkoxy)-1,3-propanediol, a 2-hydroxyalkoxyalkyl-2-alkyl-1,3-propanediol or a 2,2-di(hydroxyalkoxyalkyl)-1,3-propanediol and, wherein said alkyl is $C_1$–$C_{24}$ linear or branched alkyanyl or alkenyl and that said alkoxy is selected from the group consisting of ethoxy, propoxy, butoxy, phenylethoxy nominally comprising 0.2–20 alkoxy units or is a combination of two or more of said alkoxy nominally comprising 0.2–10 units of respective alkoxy and nominally comprising a total of 0.2–20 alkoxy units and obtaining the dendritic polyether.

2. A process for manufacture of a dendritic polyether comprising a core, derived from a compound having two or more hydroxyl groups, and at least one branching generation being built up from at least one hydroxyoxetane having one oxetane group and at least one hydroxyl group, said process comprising ring opening addition to said core and ring opening polymerization of said oxetane, wherein a mixture of said compound having said two or more hydroxyl groups and at least one cationic initiator is prepared and optionally heated to 90–130° C., that said hydroxyoxetane is fed to said mixture at a rate resulting in and/or maintaining a reaction temperature, during said ring opening addition and said ring opening polymerization, being below onset at thermal degradation and in an amount resulting in said at least one branching generation, that said initiator is present in an amount of 0.1–0.5% by weight calculated on said core and said hydroxyoxetane, preferably in an amount giving a ratio or hydroxyl groups to initiator of between 1:0.01 and 1:0.05, and that yielded dendritic polyether is neutralized by addition of at least one alkaline compound and optionally purified, wherein said compound having said at least two hydroxyl groups is a monoallyl or mono(methallyl) ether of glycerol, trimethylolethane or trimethylolpropane.

3. A process for manufacture of a dendritic polyether comprising a core, derived from a compound having two or more hydroxyl groups, and at least one branching generation being built up from at least one hydroxyoxetane having one oxetane group and at least one hydroxyl group, said process comprising ring opening addition to said core and ring opening polymerization of said oxetane, wherein a mixture of said compound having said two or more hydroxyl groups and at least one cationic initiator is prepared and optionally heated to 90–130° C., that said hydroxyoxetane is fed to said mixture at a rate resulting in and/or maintaining a reaction temperature, during said ring opening addition and said ring opening polymerization, being below onset at thermal degradation and in an amount resulting in said at least one branching generation, that said initiator is present in an amount of 0.1–0.5% by weight calculated on said core and said hydroxyoxetane, preferably in an amount giving a ratio of hydroxyl groups to initiator of between 1:0.01 and 1:0.05, and that yielded dendritic polyether is neutralized by addition of at least one alkaline compound and optionally purified wherein said compound having said at least two hydroxyl groups is a monoallyl, diallyl, mono-methallyl) or di(methallyl) ether of di(trimethylolethane), di(trimethylolpropane) or pentaerythritol.

4. A process for manufacture of a dendritic polyether comprising a core, derived from a compound having two or more hydroxyl groups, and at least one branching generation being built up from at least one hydroxyoxetane having one oxetane group and at least one hydroxyl group, said process comprising ring opening addition to said core and ring opening polymerization of said oxetane, wherein a mixture of said compound having said two or more hydroxyl groups and at least one cationic initiator is prepared and optionally heated to 90–130° C., that said hydroxyoxetane is fed to said mixture at a rate resulting in and/or maintaining a reaction temperature, during said ring opening addition and said ring opening polymerization, being below onset at thermal degradation and in an amount resulting in said at least one branching generation, that said initiator is present in an amount of 0.1–0.5% by weight calculated on said core and said hydroxyoxetane, preferably in an amount giving a ratio of hydroxyl groups to initiator of between 1:0.01 and 1:0.05, and that yielded dendritic polyether is neutralized by addition of at least one alkaline compound and optionally purified wherein said compound having said at least two hydroxyl groups is a 1,ω-diol, said 1,ω-diol is a di, tri or polyethylene glycol, a di, tri or polypropylene glycol or an alkyl, alkoxy or alkoxyalkyl substituted species thereof, and, wherein said alkyl is $C_1$–C24 linear or branched alkanyl or alkenyl and that said alkoxy is selected from the group consisting of ethoxy, propoxy, butoxy, phenylethoxy nominally comprising 0.2–20 alkoxy units or is a combination of two or more of said alkoxy nominally comprising 0.2–10 units of respective alkoxy and nominally comprising a total of 0.2–20 alkoxy units and obtaining the dendritic polyether.

5. The process of claim 1, wherein said alkyl is $C_1$–$C_{12}$.

6. The process of claim 1, wherein said alkyl is $C_1$–$C_8$.

7. A process for manufacture of a dendritic polyether having a polydispersity of less than 2, a thermal degradation point of more than 200° C. and a residual monomer content of less than 1% by weight, which dendritic polyether comprises a core, derived from a compound having two or more hydroxyl groups, and at least two branching generations being built up from at least one hydroxyoxetane having one oxetane group and at least one hydroxyl group, and which process comprises ring opening addition to said core and ring opening polymerization of said oxetane in the presence of at least one cationic initiator, and obtaining the dendritic polyether, wherein
  i) at least one di, tri or polyhydric alcohol and said cationic initiator is mixed and optionally heated to 90–130° C.
  ii) said di, tri or polyhydric alcohol is selected from the group consisting of a 5,5-dihydroxyalkyl-1,3-dioxane, a 5,5-di(hydroxyalkoxy)-1,3-dioxane, a 5,5-di-(hydroxyalkoxyalkyl)-1,3-dioxane, a 2-alkyl-1,3-propanediol, a 2,2-dialkyl-1,3--propanediol, a 2-hydroxy-1,3-propanediol, a 2,2-dihydroxy-1,3-propanediol, a 2-hydroxy-2-alkyl-1,3-prop anediol, a 2-hydroxyalkyl-2-alkyl-1,3-propanediol, a 2,2-di(hydroxyalkyl)-1,3-propanediol, a 2-hydroxyalkoxy-2-alkyl-1,3-propanediol, a 2,2-di(hydroxyalkoxy)-1,3-propanediol, a 2-hydroxyalkoxyalkyl-2-alkyl-1,3-propanediol, a 2,2-di(hydroxyalkoxyalkyl)-1,3-propanediol or is selected from the group consisting of a dimer, a trimer and a polymer of a said di, tri or polyhydric alcohol, wherein said alkyl is a $C_1$–$C_{24}$ linear or branched alkanyl or alkenyl and said alkoxy is selected from the group consisting of ethoxy, propoxy, butoxy and phenylethoxy nominally comprising 0.2–20 alkoxy units or is selected from the group consisting of a combination of two or more of said alkoxy nominally comprising 0.2–10 units of respective alkoxy and nominally comprising a total of 0.2–20 alkoxy units,
  iii) said hydroxyoxetane is fed to obtained mixture during at least 30 minutes, while maintaining a reaction temperature of 110±20° C., in an amount resulting in said at least two branching generations,
  iv) said initiator is present in an amount of 0.1–0.5% by weight calculated on said di, tri or polyhydric alcohol and said hydroxyoxetane, and
  v) yielded dendritic polyether is neutralised by addition of at least one alkaline compound and optionally purified.

8. A process according to claim 7, wherein said alkaline compound is a hydroxide and/or carbonate of at least one alkali metal and/or alkaline earth metal.

9. A process according to claim 7, wherein said alkaline compound is ammonia or an amine.

10. A process according to claim 7, wherein said reaction temperature is 100±10° C.

11. A process according to claim 7, wherein yielded dendritic polyether has a polydispersity of less than 1.8.

12. A process according to claim 7, wherein yielded dendritic polyether has a polydispersity of less than 1.6.

13. A process according to claim 7, wherein yielded dendritic polyether has thermal degradation point of more than 250° C.

14. A process according to claim 7, wherein yielded dentritic polyether has a residual monomer of less than 0.8% by weight.

15. A process according to claim 7, wherein yielded dentritic polyether has a residual monomer of less than 0.6% by weight.

16. A process according to claim 7, wherein said alkyl is $C_1$–$C_{12}$ linear or branched alkanyl or alkenyl.

17. A process according to claim 7, wherein said alkyl is $C_1$–$C_8$ linear or branched alkanyl or alkenyl.

18. A process according to claim 7, wherein said di, tri or polyhydric alcohol is 5,5-dihydroxymethyl-1,3-dioxane, 2-methyl-1,3-propanediol, 2-methyl-2-ethyl-1,3--propanediol, 2-ethyl-2-butyl-1,3-propanediol, neopentyl glycol, dimethylpropane, trimethylolethane, trimethylolpropane, di(trimethylolethane), di(trimethylolpropane), pentaerythritol or di(pentaerythritol).

19. A process according to claim 7, wherein said hydroxyoxetane is selected from the group consiting of a 3-alkyl-3-(hydroxyalkyl)oxetane, a 3,3-di(hydroxyalkyl)oxetane, a 3-alkyl-3-(hydroxyalkoxy)oxetane and a 3-alkyl-3-(hydroxyalkoxyalkyl)oxetane.

20. A process according to claim 7, wherein said hydroxyoxetane is selected from the group consisting of a dimer, a trimer and a polymer of a 3-alkyl-3-(hydroxyalkyl)oxetane, a 3,3-di(hydroxyalkyl)oxetane, a 3-alkyl-3-(hydroxyalkoxy)oxetane or a 3-alkyl-3-(hydroxyalkoxyalkyl)oxetane.

21. A process according to claim 20, wherein said alkyl is $C_1$–$C_{24}$, linear or branched alkanyl or alkenyl and that said alkoxy is ethoxy, propoxy, butoxy, phenylethoxy nominally comprising 0.2–20 alkoxy units or is a combination of two or more of said alkoxy nominally comprising 0.2–10 units of respective alkoxy and nominally comprising a total of 0.2–20 alkoxy units.

22. A process according to claim 21, wherein said alkyl is $C_1$–$C_{12}$ linear or branched alkanyl or alkenyl.

23. A process according to claim 21, wherein said alkyl is $C_1$–$C_8$, linear or branched alkanyl or alkenyl.

24. A process according to claim 7, wherein said hydroxyoxetane is 3-methyl-3-(hydroxymethyl)oxetane, 3-ethyl-3-(hydroxymethyl)oxetane or 3,3-di(hydroxymethyl)oxetane.

25. A process according to claim 7, wherein said at least one cationic initiator is a Lewis acid.

26. A process according to claim 25, wherein said Lewis acid is selected from the group consisting of $AlCl_3$, $BF_3$, $TiCl_4$, $ZnI_2$, $SiF_4$, $SbF_5$, $PF_5$, $AsF_5$ and $SbCl_5$.

27. A process according to claim 7, wherein said at least one cationic initiator is a halogenated acid.

28. A process according to claim 27, wherein said halogenated acid is $FSO_3H$, $ClSO_3H$, $HClO_4$, $HIO_4$ and $CF_3SO_3H$.

29. A process according to claim 7, wherein said alkaline compound is a hydroxide or a carbonate of at least one alkali metal or alkaline earth metal.

30. A process according to claim 7, wherein said alkaline compound is an amine.

* * * * *